(12) United States Patent
Ellis et al.

(10) Patent No.: US 10,209,510 B2
(45) Date of Patent: Feb. 19, 2019

(54) COMPACT MODULAR SCANNERS FOR SCANNING LASER DEVICES

(71) Applicant: Microvision, Inc., Redmond, WA (US)

(72) Inventors: Matthew Ellis, Sammamish, WA (US); Jason B. Tauscher, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 184 days.

(21) Appl. No.: 15/454,856

(22) Filed: Mar. 9, 2017

(65) Prior Publication Data

US 2018/0259765 A1     Sep. 13, 2018

(51) Int. Cl.
*G02B 26/08* (2006.01)
*G02B 26/10* (2006.01)
*H04N 9/31* (2006.01)
*B81B 3/00* (2006.01)

(52) U.S. Cl.
CPC ........ *G02B 26/0833* (2013.01); *B81B 3/0083* (2013.01); *H04N 9/3129* (2013.01); *B81B 2201/042* (2013.01); *B81B 2203/058* (2013.01); *G02B 26/085* (2013.01); *G02B 26/0858* (2013.01); *G02B 26/105* (2013.01); *G02B 26/106* (2013.01)

(58) Field of Classification Search
CPC ............ G02B 26/0833; G02B 26/0841; G02B 26/085; G02B 26/0858; G02B 26/0866; G02B 26/10; G02B 26/101; G02B 26/105; B81B 3/0083; B81B 2201/042; B81B 2203/058; H04N 9/3129
See application file for complete search history.

(56) References Cited

U.S. PATENT DOCUMENTS

| | | | | |
|---|---|---|---|---|
| 2003/0214460 A1* | 11/2003 | Kovacs | ............... | G02B 26/0833 345/32 |
| 2004/0076008 A1* | 4/2004 | Ikeda | .................... | B81C 1/0015 362/259 |
| 2007/0268950 A1* | 11/2007 | Spinelli | .............. | G02B 26/0833 372/99 |
| 2010/0238533 A1* | 9/2010 | Nakamura | ......... | G02B 26/0833 359/223.1 |

* cited by examiner

*Primary Examiner* — William R Alexander
*Assistant Examiner* — Ephrem Z Mebrahtu
(74) *Attorney, Agent, or Firm* — Kevin D. Wills

(57) ABSTRACT

The embodiments described herein provide scanners with a modular construction that includes a separately formed scan plate coupled to a microelectromechanical system (MEMS) flexure structure. Such modular scanners, when incorporated into laser scanning devices, reflect laser light into a pattern of scan lines. In general, the modular scanner includes a scan plate that is formed separately from the flexure structure. The scan plate and flexure structure each include coupling features that serve to couple the scan plate to the flexure structure. The flexure structure includes flexure arms that facilitate rotation of the scan plate to reflect laser light into a pattern of scan lines.

19 Claims, 12 Drawing Sheets

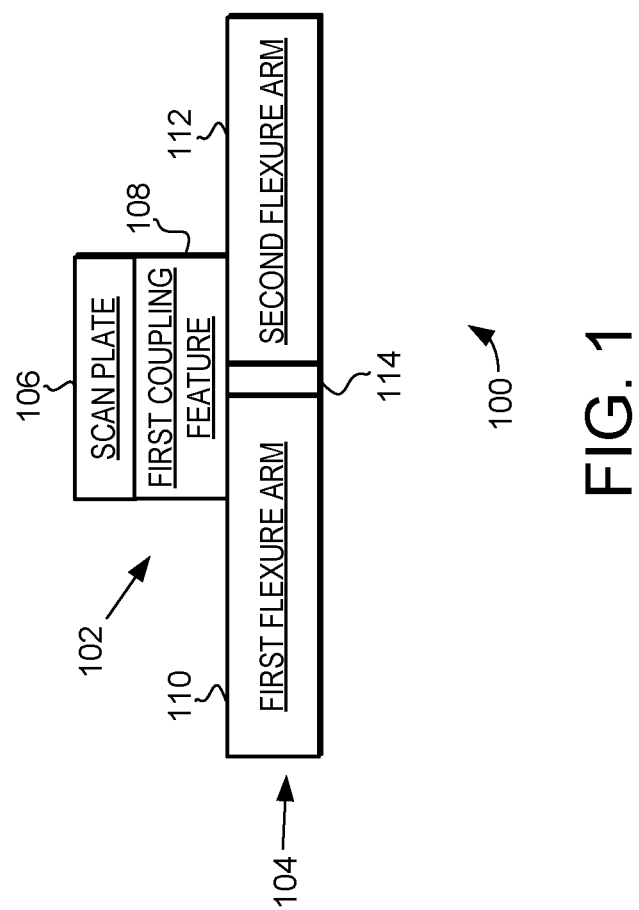

COMPACT MODULAR SCANNERS FOR SCANNING LASER DEVICES

BACKGROUND

In scanning laser devices, laser light is reflected off one or more scanning mirrors to generate a scanning pattern. For example, in scanning laser projectors, images are projected by scanning laser light into a pattern with a scanning mirror, with individual pixels generated by modulating the laser light. Similarly, laser depth scanners generate depth maps by scanning laser light into a pattern with a scanning mirror and measuring the laser light reflected back.

One issue with scanning laser devices is the need to manage mechanical distortion in the scanning mirrors. Specifically, as a scanning mirror rotates forces are applied to the mirror and these forces can cause distortions in the mirror surface. Furthermore, as mirror rotation angles and/or speed have increased in modern devices the forces applied to the mirror have also increased. These increased forces can result in increased distortions in the mirror surface. When such distortions are large enough the resulting scanning pattern can be distorted and image quality can be noticeably reduced. Thus, there is a need for devices and methods for managing the mirror distortion in scanning laser devices.

Another issue with scanning laser devices is device complexity. Specifically, there has been an increasing need for more compact scanning laser device size while performance requirements have been maintained or increased. To meet these needs, more scanners with more complex structure and shapes have been proposed. Unfortunately, such designs can also lead to increased manufacturing complexity, which can reduce yield and increase costs. Thus, there is a need for devices and methods that facilitate performance and compact size while reducing manufacturing complexity and cost.

BRIEF DESCRIPTION OF THE DRAWINGS

FIG. 1 shows a schematic diagram of scanner in accordance with various embodiments of the present invention;

DESCRIPTION OF EMBODIMENTS

Figure 2A:
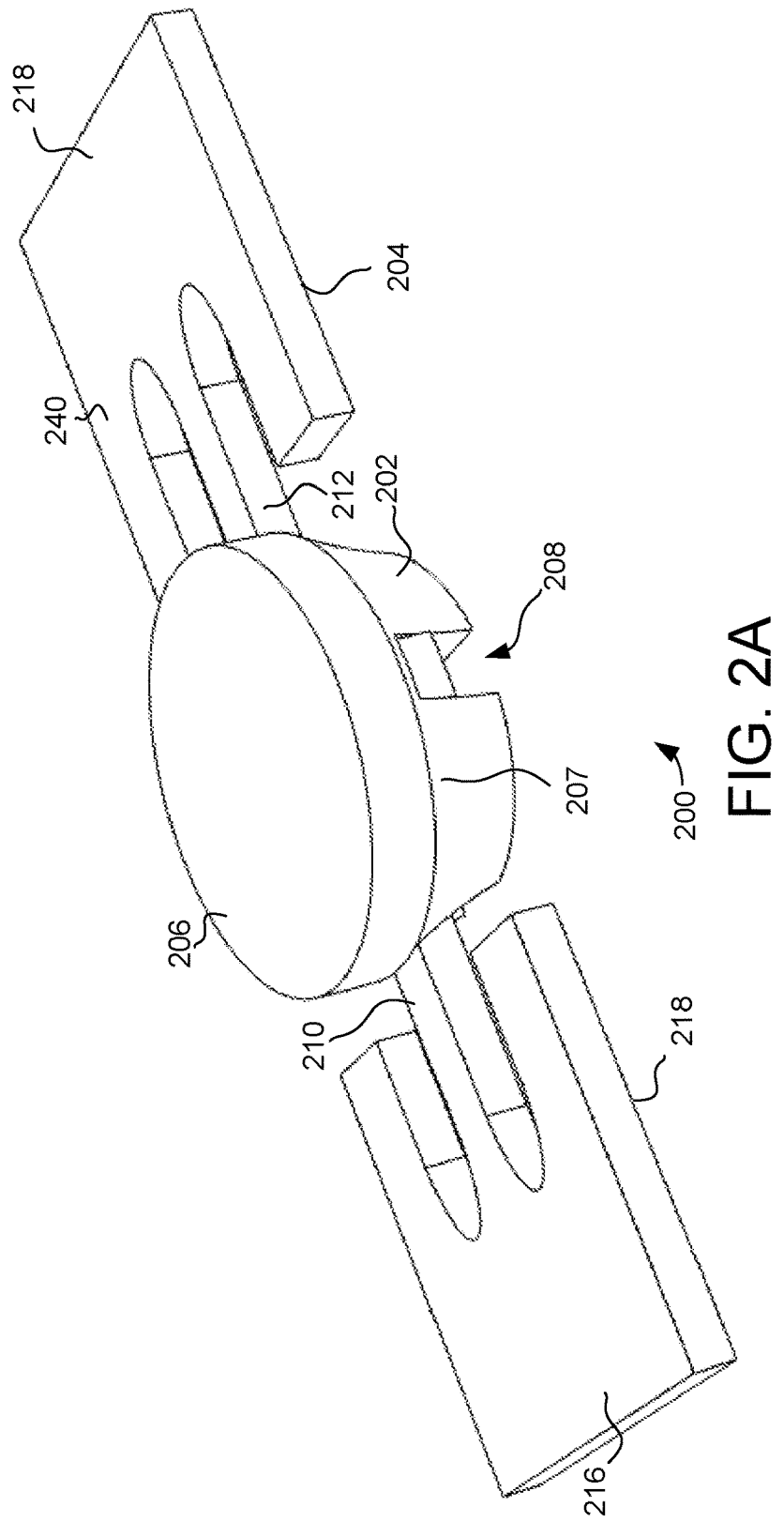
FIGS. 2A, 2B, 2C, and 2D illustrate perspective views of a scanner in accordance with an embodiment of the present invention.
Figure 2B:
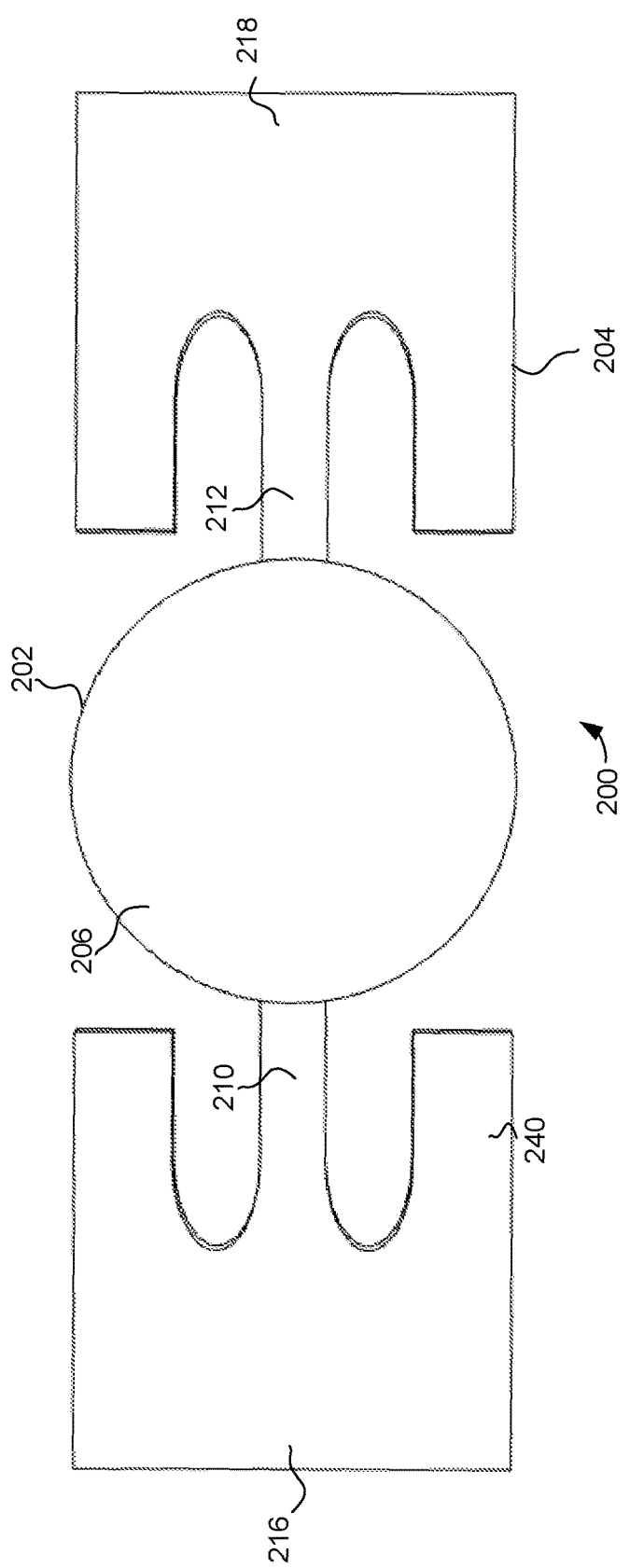
Figure 2C:
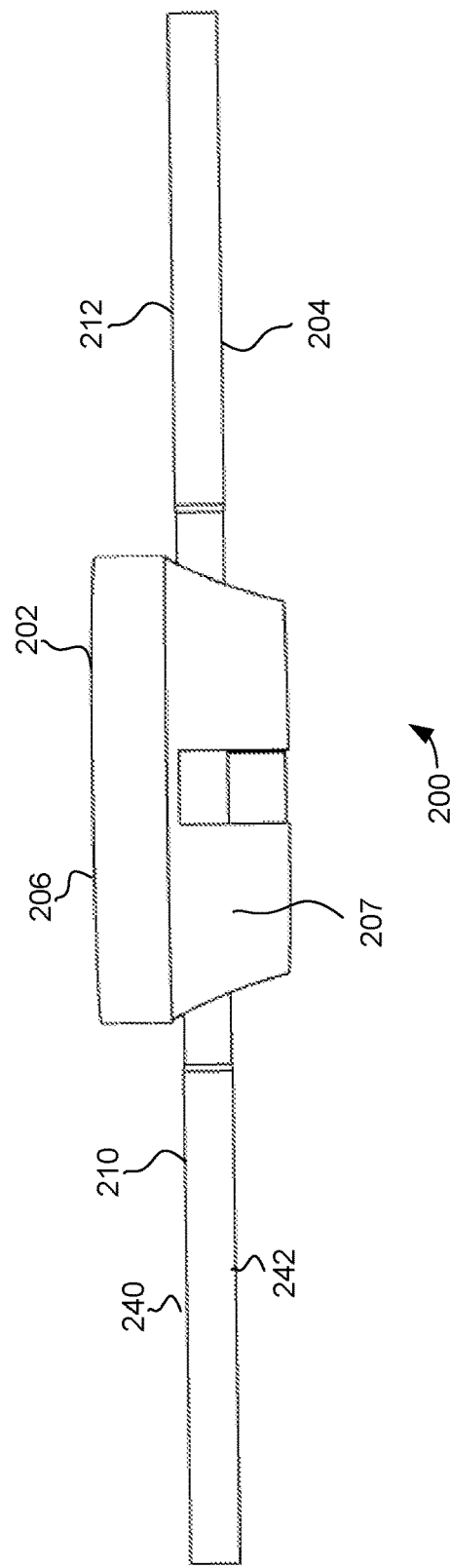
Figure 2D:
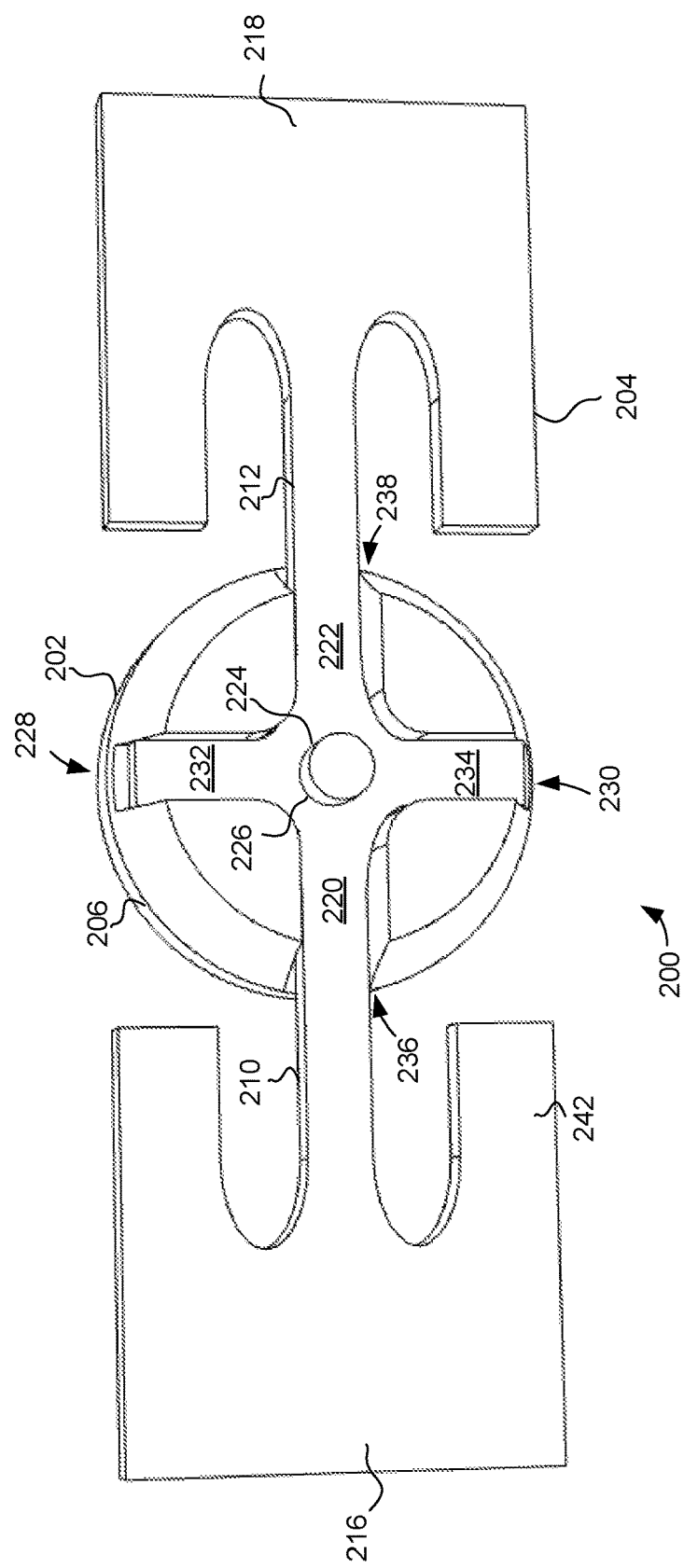

The embodiments described herein include scanning mirrors that can provide improved scanning laser devices. Specifically, the embodiments described herein provide scanners with a modular construction that includes a separately formed scan plate coupled to a microelectromechanical system (MEMS) flexure structure. Such modular scanners, when incorporated into laser scanning devices, reflect laser light into a pattern of scan lines. When so implemented, such modular scanners can provide improved device flexibility, reduced distortion in the mirror surface, reduced manufacturing complexity, and/or reduced device size. Thus, such modular scanners can provide improved scanning laser devices, including scanning laser projectors and laser depth scanners, LIDAR systems, 3D motion sensing devices, gesture recognition devices, etc. Examples of such scanning laser projectors include traditional image projectors, head-up displays (HUD), and helmet mounted displays (HMD).

In general, the modular scanner includes a scan plate that is formed separately from the flexure structure. The scan plate and flexure structure each include coupling features that serve to couple the scan plate to the flexure structure. The flexure structure includes flexure arms that facilitate rotation of the scan plate to reflect laser light into a pattern of scan lines. In one embodiment, these flexure arms comprise torsion arms that facilitate rotation of the scan plate by twisting. In other embodiments, these flexure arms comprise bending arms or bending beams that facilitate rotation of the scan plate by bending.

The modular configuration of the scanner facilitates the overlapping of the flexure arms with the scan plate. This overlap allows the flexure arms to have a longer effective length relatively to the overall size of the scanner. Thus, this configuration can facilitate a relatively compact overall scanner size, or alternatively can facilitate relatively long flexure arms in a scanner of equivalent size.

Turning now to FIG. 1, an exemplary scanner 100 is illustrated schematically. The scanner 100 includes a scan plate 102 and a flexure structure 104. The scan plate 102 includes a scanning surface 106 and a body structure extending away from the scanning surface, the body structure including a first coupling feature 108. The flexure structure 104 includes a first flexure arm 110, a second flexure arm 112, and second coupling feature 114. The first coupling feature 108 is configured to couple to the second coupling feature 114. The first flexure arm 110 and the second flexure arm 112 are configured to facilitate rotation of the scan plate 102, and the scanning surface 106 is configured to reflect laser light into a pattern of scan lines when the scan plate 102 is rotated. In one embodiment, the first flexure arm 110 and the second flexure arm 112 comprise torsion arms that facilitate rotation of the scan plate by twisting. In other embodiments, the first flexure arm 110 and the second flexure arm 112 comprise bending arms or bending beams that facilitate rotation of the scan plate by bending.

In accordance with the embodiments described herein, the scan plate 102 is formed separately from the flexure structure 104. Furthermore, the flexure arms 110 and 112 partially overlap with the scanning surface 106. Specifically, a first portion of the first flexure arm 110 and a second portion of the second flexure arm 112 each overlap with a portion of the scanning surface 106. This overlap can allow the flexure arms 110 and 112 to have a longer effective length relatively to the overall size of the scanner 100. Likewise, this overlap can facilitate relatively large scanning surface 106 relative to the overall size of the scanner 100.

It should be noted that in a typical embodiment, the overlap of the scanning surface 106 with the flexure arms 110 and 112 is significant compared to the overall length of the scanner 100. For example, in one specific embodiment, the portion of the first flexure arm 110 that overlaps with the scanning surface 106 has a length of at least 20 percent the overall length of the first flexure arm 110. Likewise, the portion of the second flexure arm 112 that overlaps with the scanning surface 106 can have a length of at least 20 percent the overall length of the first flexure arm 120. Stated another way, the first portion of the first flexure arm 110 has an overlapping length, and the overlapping length of the first portion of the flexure arm is at least 20 percent of the overall length of the first flexure arm 110.

The flexure structure 104 is formed from a unitary MEMS semiconductor substrate and can be formed using any suitable MEMS fabrication technique. The modular configuration of the scanner 100 facilitates the fabrication of scan plate 102 using a variety of techniques, including non-MEMS techniques. For example, the scan plate 102 can be formed using molding. The use of other techniques to form the scan plate 102 facilitates the formation of coatings and/or specialized shapes in the scanning surface 106. For example, optical coatings can be formed on the scanning surface 106 that would be unavailable or difficult on a scan plate formed using MEMS techniques. As other examples, the scanning surface 106 can be formed to have a shaped surface, a selectively reflective surface, or a diffraction surface.

The modular configuration of the scanner 100 can also provide an offset between the scanning surface 106 of the scan plate 102 and the flexure structure 104. This offset between the scanning surface 106 and the flexure structure 104 can reduce the distortion that occurs in the scanning surface as a result of rotational forces in the flexure structure 104 during operation of the scanner 100.

Thus, the modular scanner 100 can be implemented to provide improved device flexibility, reduced distortion in the mirror surface, reduced manufacturing complexity, and/or reduced device size.

In one embodiment the first coupling feature 108 and the second coupling feature 114 are implemented to fasten together with an interference fit. In other embodiments, the first coupling feature 108 and the second coupling feature 114 are implemented to fasten together using an adhesive. In yet other embodiments, the first coupling feature 108 and the second coupling feature 114 are implemented to fasten together with a mechanical fastener, such as a screw, rivet, pin or clip. Specific examples of a first coupling feature 108 and a second coupling feature 114 will be discussed below.

As noted above, the flexure structure 104 can be formed using MEMS fabrication techniques, including photolithography and micromachining. Thus, the first flexure arm 110, the second flexure arm 112, and the second coupling feature 114 are all formed from the same substrate using MEMS techniques. In a typical embodiment, the flexure structure 104 would be photolithographically formed from single-crystal silicon. However, use of polycrystalline silicon or combination of single and polycrystalline silicon can also be used to achieve the desired structures. In yet other embodiments, other materials such as gallium arsenide (GaAs) or silicon carbide (SiC) can be used.

In such techniques, multiple flexure structures 104 can be patterned from a single wafer using a variety of photolithographic techniques, and then the individual scanners separated and removed. These techniques can also include the deposition and patterning of metallization to form conductive traces, contacts and other such elements.

In some embodiments, the flexure structure 104 has a relatively simple structure that facilitates ease of MEMS fabrication. For example, the flexure structure 104 can be formed to have planar top and bottom surfaces. An example of such an embodiment will be discussed below.

As was mentioned above, the scanner 100 can be implemented in scanning laser devices, including scanning laser projectors and laser depth scanners. In such an embodiment, the scanning laser device can be implemented with a drive circuit configured to provide drive signals to one or more actuators, where the actuators generate motion in the scanner 100 in response to the drive signals. In making such an implementation, any suitable actuation technique can be used. For example, in one embodiment, the drive circuit provides drive signals to a coil in in the presence of an applied magnetic field, and this excites motion of the scanning surface 106. Other embodiments might employ other appropriate actuation schemes including, piezo, electrostatic, or any other methodology capable of providing the required mechanical force. In all cases, the resulting motion of the scanning surface 106 reflects laser light into a pattern of scan lines, and thus can facilitate image projection, depth scanning, or any other suitable laser scanning function.

In one specific embodiment that will be described in greater detail below, the scanner 100 is implemented in a scanning laser device that uses two mirrors for laser scanning. In such a device, a first mirror can be configured to deflect along one axis and a second mirror configured to deflect along a second axis that is largely perpendicular to the first axis. Furthermore, in such a device the first mirror can be used for relatively fast scan motion, while the second mirror is used for relatively slow scan motion. The scanner 100 can thus be implemented to provide either the relatively fast scan motion or the relatively slow scan motion. In one specific embodiment, the relatively fast scan motion comprises resonant sinusoidal motion while the relatively slow scan motion comprises non-resonant or quazistatic controlled motion.

One issue with relatively fast scan motion is the resulting increase in strain and other forces on the scanning surface. Because scanner 100 is highly resistant to distortion in the scanning surface, the scanner 100 is particularly well adapted to providing fast scan motion. Again, examples of such an implementation will be described in greater detail below. However, the scanner 100 can also be used to provide slow scanning motion as well.

Figure 3A:
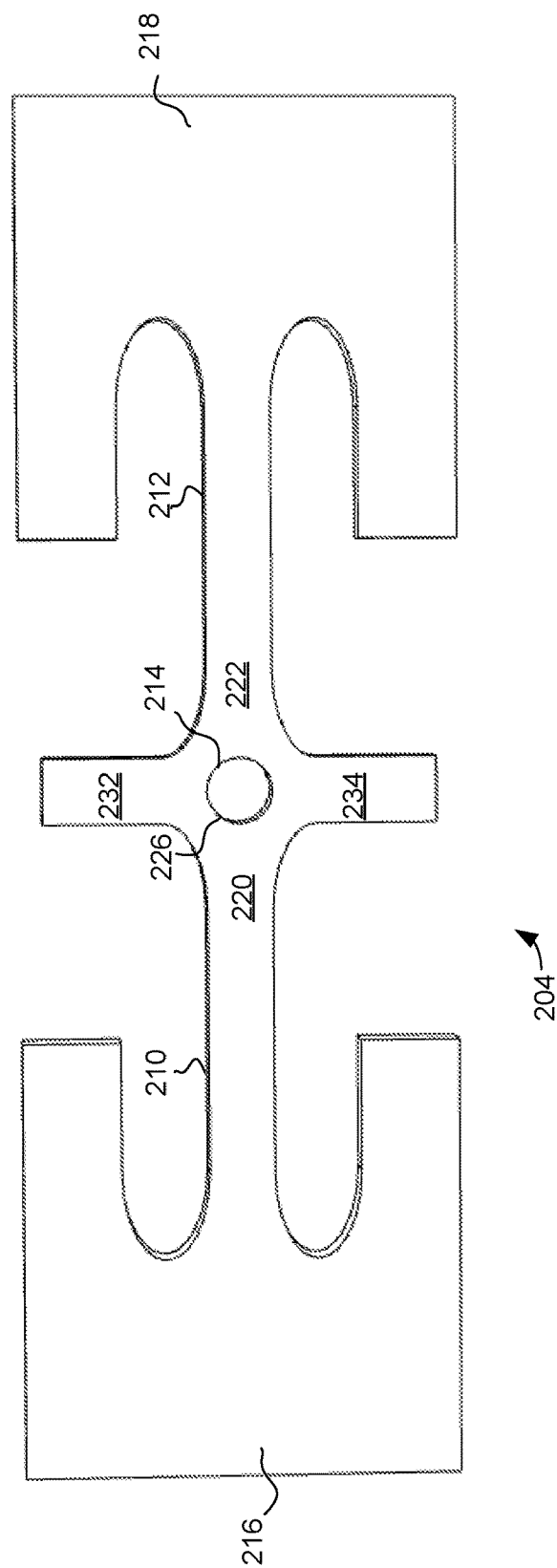
FIGS. 3A, 3B, 3C, 3D and 3E illustrates perspective views of a flexure structure and scan plate in accordance with an embodiment of the present invention.
Figure 3B:
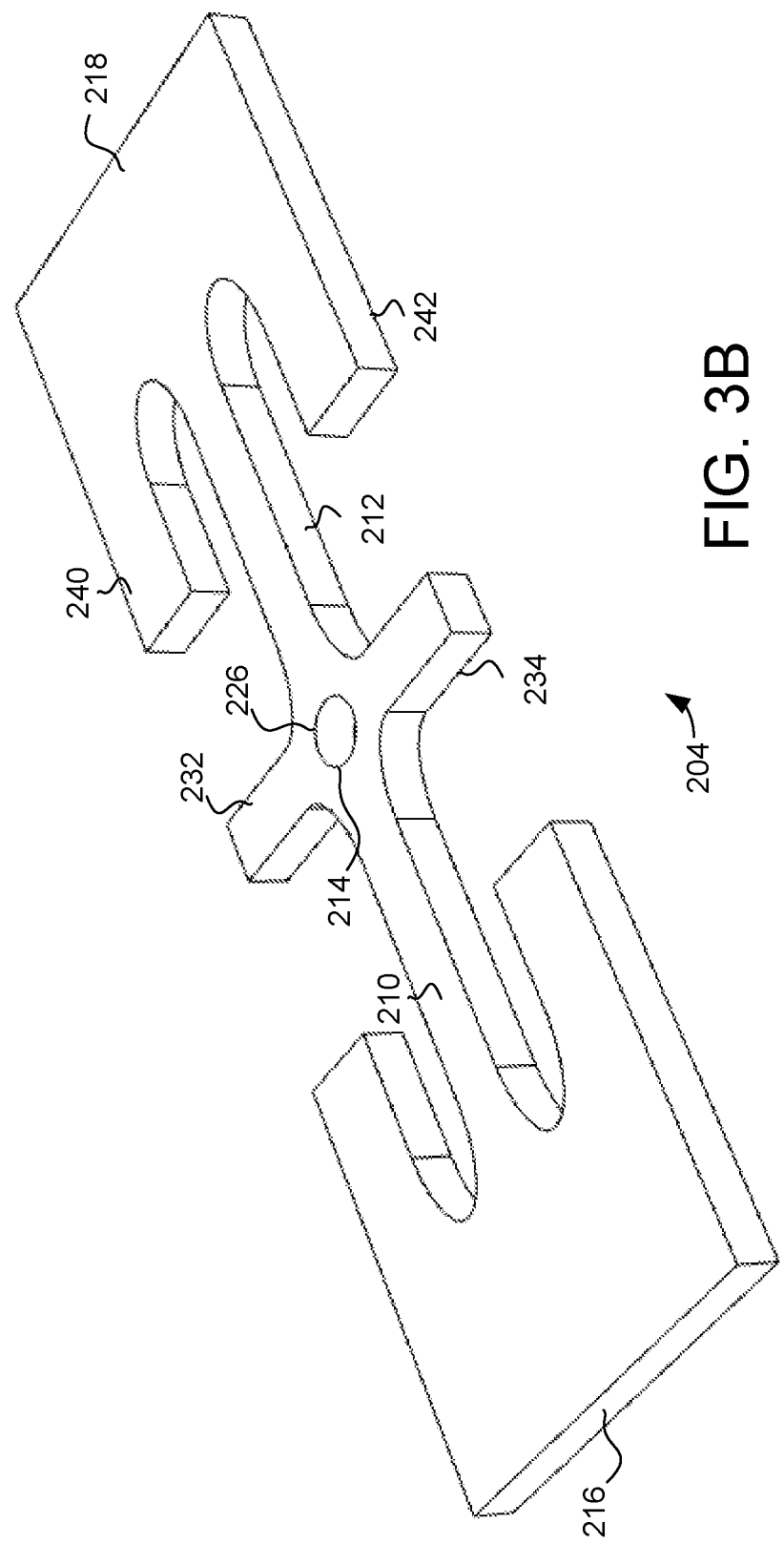
Figure 3C:
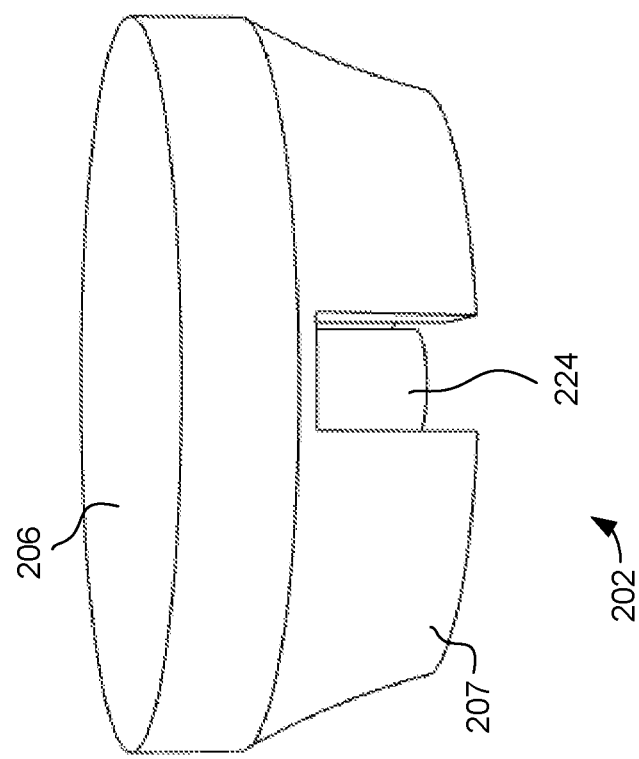
Figure 3D:
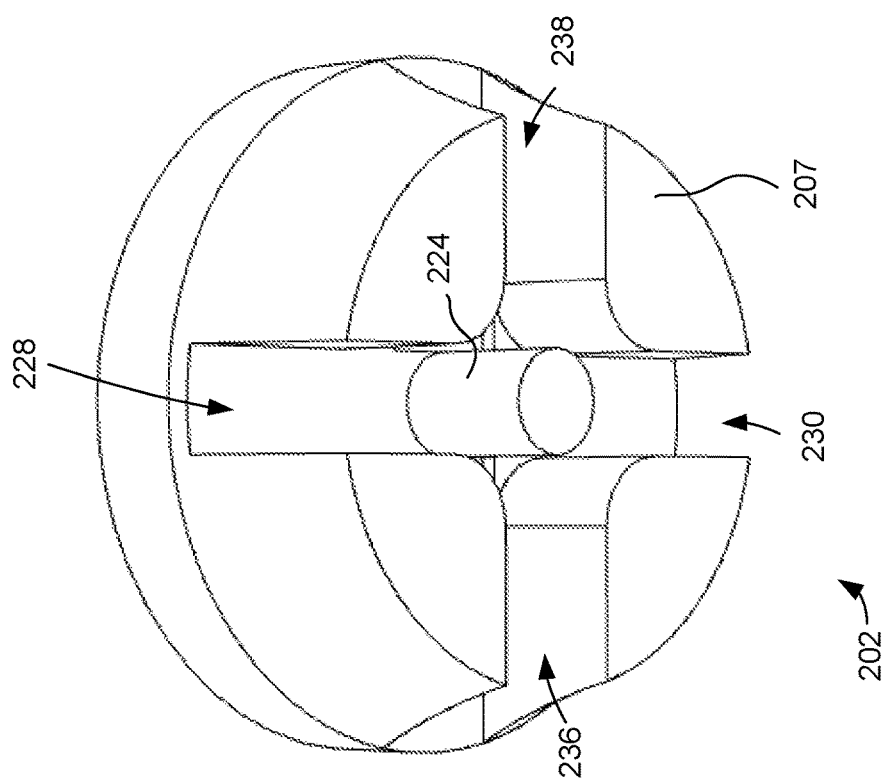
Figure 3E:
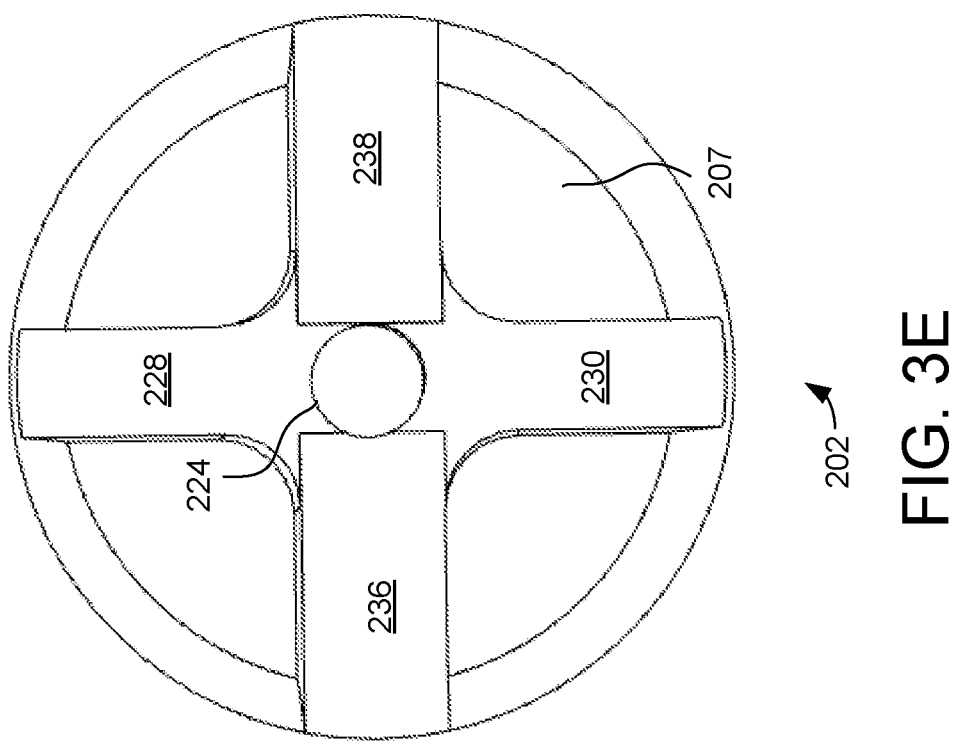

FIGS. 2A, 2B, 2C, and 2D illustrate perspective views of an exemplary scanner 200 in accordance with the embodiments described herein. The scanner 200 includes a scan plate 202 coupled to a flexure structure 204. FIGS. 3A and 3B illustrate perspective views of the flexure structure 204 separately. Likewise, FIGS. 3C, 3D and 3E illustrate perspective views of the scan plate 202 separately.

Referring now to FIGS. 2A, 2B, 2C, 2D, 3A, 3B, 3C, 3D and 3E collectively, the scan plate 202 includes a scanning surface 206 and a body structure 207 extending away from the scanning surface 206. The body structure 207 includes a first coupling feature 208. The flexure structure 204 includes a first torsion arm 210, a second torsion arm 212, a second coupling feature 214, a first mounting tab 216 and a second mounting tab 218. The first coupling feature 208 is configured to couple to the second coupling feature 214, and thus couple together the scan plate 202 and the flexure structure 204. The first torsion arm 210 and the second torsion arm 212 are configured to twist and facilitate torsional rotation of the scan plate 202, and the scanning surface 206 is configured to reflect laser light into a pattern of scan lines when the scan plate 202 is implemented into a scanning laser device and controllably rotated.

It should be noted that while FIG. 2 illustrates an embodiment where rotation of the scan plate 202 is facilitated with twisting of the first torsion arm 210 and the second flexure arm 212, that other embodiments are possible. For example, the rotation of the scan plate 202 can also be facilitated with other types of flexure arms, including bending beams that can bend to facilitate rotation of the scan plate 202. In such an embodiment the first torsion arm 210 and/or the second torsion arm 212 would be replaced with or supplemented by one or more bending beams or other flexure arm structure.

The flexure structure 204 is formed from a unitary MEMS semiconductor substrate and can be formed using any suitable MEMS fabrication technique. In accordance with the embodiments described herein, the scan plate 202 is formed separately from the flexure structure 204. As such, the scan plate can be formed from any suitable material and with any suitable process. For example, the scan plate 202 can be formed using a separate molding or machining process. As other examples, the scan plate 202 can be formed using a separate MEMS fabrication process from the MEMS fabrication process used to form the flexure structure 204.

The formation of the of the scan plate 202 using a different, separate process from the MEMS process used to form the flexure structure 204 can provide significant structural differences and resulting advantages over a unitary scanner. For example, a molded scan plate 202 can have greater flexibility in implementing the scanning surface 206. As specific examples, such a scan plate 202 can be formed to have a variety of specialized shapes and/or coatings on the scanning surface 206, including those that would be difficult to form with or otherwise incompatible with MEMS fabrication techniques.

As more specific examples, specialized optical coatings can be applied to the scanning surface 206. For example, optical coatings can be applied to improve the reflectively of the surface at the wavelengths of interest, including infrared and visual color wavelengths.

As another specific example, the scanning surface 206 can be formed with additional processing to improve or alter the axis of the planarity of the scanning surface 206. This additional processing could include processing that would be incompatible with standard MEMS processes.

As another specific example, the scanning surface 206 can be formed with non-planar optical surface. Again, the processing used to define such non-planar surface can include techniques that would be incompatible with a standard MEMS process. For example, molding, diamond turning, or other techniques commonly used to build precision optical elements.

As another specific example, the scanning surface 206 can be formed to have a diffraction or otherwise nano-structured optical surface.

Another advantage that the modular configuration of the scanner 200 can provide over a unitary scanner is increased relative length of the torsion arms 210 and 212. In the scanner 200, the torsion arms 210 and 212 partially overlap with the scanning surface 206. Specifically, a first portion 220 of the first torsion arm 210 and a second portion 222 of the second torsion arm 212 each overlap with a portion of the scanning surface 206 (See FIG. 2D). This overlap can allow the torsion arms 210 and 212 to have a longer effective length. Specifically, because the first portion 220 and second portion 222 can each provide some torsion flex and rotation the effective length of the first torsion arm 210 and the second torsion arm 212 extend to under the scanning surface 206. In contrast, in past designs the torsion arms ended at the scan plate and did not extend under the scanning surface. Thus, the torsion arms 210 and 212 have a longer effective length relatively to the overall size of the scanner 200 compared to such past designs. Likewise, this overlap facilitates relatively large scanning surface 206 relative to the overall size of the scanner 200.

In this illustrated embodiment, the first portion 220 of the first torsion arm 210 that overlaps with the scanning surface 206 has a length of at least 20 percent the overall length of the first torsion arm 210. Likewise, the second portion 222 of the second torsion arm 212 that overlaps with the scanning surface 206 has a length of at least 20 percent the overall length of the first torsion arm 220. It should be noted however, that this is just one example, and that other embodiments can include more or less overlap of the torsion arms and the scanning surface.

The modular configuration of the scanner 200 also provides an offset between the scanning surface 206 of the scan plate 202 and the flexure structure 204. This offset between the scanning surface 206 and the flexure structure 204 can reduce distortion in the scanning surface that could occur as a result of rotational forces in the flexure structure 204 during operation of the scanner 200.

Thus, the modular scanner 200 can be implemented to provide improved device flexibility, reduced distortion in the mirror surface, reduced manufacturing complexity, and/or reduced device size.

In the illustrated embodiment, the first coupling feature 208 comprises a pin 224, and the second coupling feature 214 comprises an opening 226. The pin 224 and the opening 226 are implemented to fasten together with an interference fit. To provide an interference fit the pin 224 and the opening 226 are pushed together and the fastening is achieved at least in part by the friction between the pin 224 and the opening 226. Of course, the pin 224 and the opening 226 are just one example of the type of coupling features that can be used to provide an interference fit in such a scanner 200. For example, various tapered structures can be used to provide an interference fit.

Furthermore, it should be noted that in some embodiments it may be desirable to further facilitate fastening through the use of an adhesive or a mechanical fastener in addition to the interference fit between the pin 224 and the opening 226. Furthermore, in other embodiments mechanical fasteners and/or adhesives can be used in place of an interference fit.

In this illustrated embodiment, the scan plate 202 further comprises a first slot 228 and a second slot 230 (See FIG. 3E). Likewise, the flexure structure 204 further comprises a first beam 232 and a second beam 234 (see FIG. 3A). In this embodiment these slots 228 and 230 and beams 232 and 234 provide additional attachment strength between the scan plate 202 and the flexure structure 204.

Specifically, in this embodiment, the first beam 232 is configured to engage with the first slot 228, and the second beam 234 is configured to engage with the second slot 230. For example, the width of the slots 228 and 230 can be sized to have an interference fit with the beams 232 and 234. Such an embodiment will increase the area of friction between the scan plate 202 and the flexure structure 204, and can thus strengthen the attachment provided by the first coupling feature 208 and the second coupling feature 214.

Furthermore, in this illustrated embodiment the scanner plate 202 further comprises a first channel 236 and a second channel 238 (See FIG. 3E). The first channel 236 is configured to provide space for the first torsion arm 210 to rotate. Likewise, the second channel 238 is configured to provide space for the second torsion arm 212 to rotate. To facilitate this, the first channel 236 and the second channel 238 are sized wider that the torsion arms 210 and 212. Furthermore, the first channel 236 and the second channel 238 should be each formed deep enough to provide a gap and avoid contact with the top of the torsion arms 210 and 212. So configured, the first channel 236 and the second channel 238 will not interfere with the flex and rotation of the torsion arms 210 and 212.

In the illustrated embodiment, the flexure structure 204 has a relatively simple structure that facilitates ease of MEMS fabrication. For example, the flexure structure 204 has a substantially uniform, planar top surface 240 and a substantially uniform, planar bottom surface 242. Furthermore, the top surface 240 and the bottom surface 242 are parallel in this illustrated embodiment. Such a relatively simple structure can be reliably formed with a minimum of traditional MEMS fabrication techniques, and thus improve manufacturing yield and/or reduce manufacturing cost.

In scanner 200 the scanning surface 206 has a perimeter. In the illustrated embodiment, the perimeter is a circular perimeter, but other embodiments can have different configurations.

As noted above, the modular configuration of the scanner 200 also provides an offset between the scanning surface 206 of the scan plate 202 and the flexure structure 204. In one specific embodiment, the top surface of the flexure structure 204 is offset from the scanning surface 206 a distance corresponding to 10% of the scanning surface 206 diameter. As one specific example, the offset can again be at least 0.2 mm. Again, providing such an offset between the flexure structure 204 and the scanning surface 206 can reduce the distortion that would otherwise occur in the scanning surface 206 as a result of rotational forces in the scanner 200.

The example embodiments of FIGS. 2A-2D and 3A-3E can include other features not illustrated in those figures. For example, the coil traces may be provided to interact with applied magnetic fields and generate motion. In other embodiments, features may be provided to facilitate piezoelectric actuation. Additionally, electrical contracts can be formed to provide electrical connection between the scanners and an attached die carrier. For example, such contacts can be configured to provide electrical connection to elements such as sensors.

As one detailed example, during operation a drive circuit (not shown in FIGS. 2 and 3) can provide drive signals to one or more coil traces. Those drive signals create electromagnetic interactions between the coil traces and an applied magnetic field, and those interactions excite motion of the scan plate (e.g., scan plate 102, 202). This resulting motion of the scan plate can be configured to reflect laser light into a pattern of scan lines, and thus can facilitate laser scanning.

As another detailed example, during operation a drive circuit can provide drive signals to one or more piezoelectric actuators, which in turn generate motion in the scan plate. This resulting motion of the scan plate can be configured to reflect laser light into a pattern of scan lines, and thus can facilitate laser scanning.

In some embodiments the scanner may also incorporate one or sensors. For example, the scanner may also include one or more integrated piezoresistive position sensors. These piezoresistive sensors can be configured to produces a voltage that represents the displacement of scan plate, and this voltage can be provided as feedback to the drive circuit.

The scanners 100 and 200 can be implemented in variety of scanning laser devices, including scanning laser projectors and laser depth scanners. For example, the scanners can be implemented as part of a scanning laser device to provide relatively fast, resonant motion, while a relatively slow scan motion is provided by another mirror.

Figure 4:
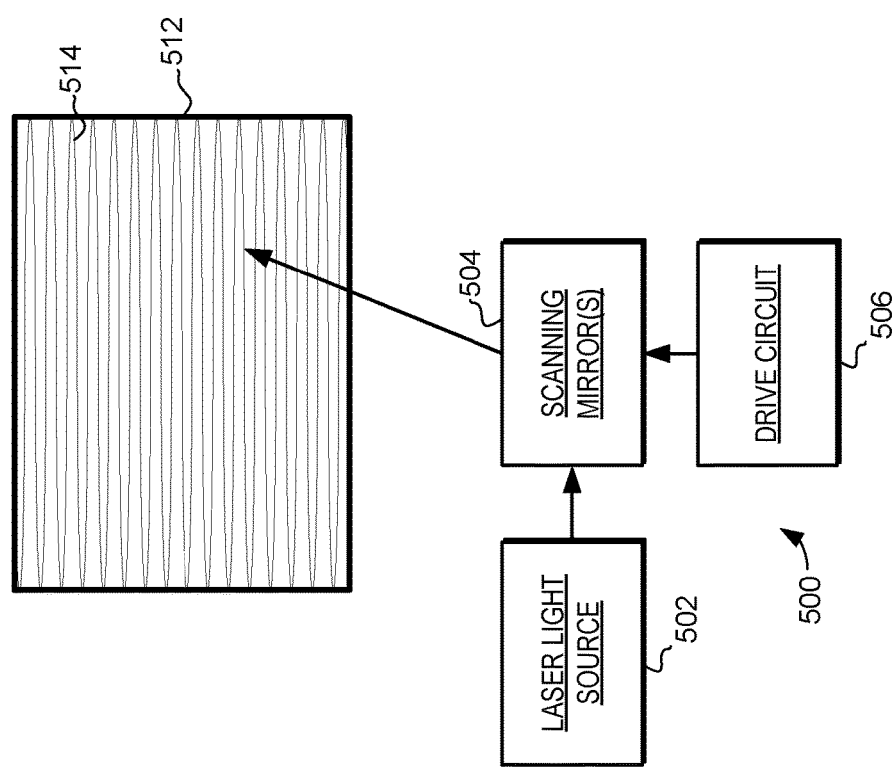
FIG. 4 shows a schematic view of a scanning laser device in accordance with various embodiments of the present invention.

Turning now to FIG. 4, a schematic diagram of a scanning laser device 500 is illustrated. The scanning laser device 500 includes a laser light source 502, scanning mirror(s) 504 and a drive circuit 506. During operation, the laser light source 502 generates at least one beam of laser light that is reflected by the scanning mirror(s) 504 into a pattern 514 of scan lines inside a scanning region 512. In the example of FIG. 4, the pattern 514 of scan lines comprises a raster pattern. However, this is just one example, and in other embodiments other patterns of scan lines can be generated as used. For example, spiral patterns and Lissajous patterns could instead be implemented.

To facilitate this, the drive circuit 506 controls the movement of the scanning mirror(s) 504. Specifically, the drive circuit 506 provides excitation signal(s) to excite motion of the scanning mirror(s) 504.

In accordance with the embodiments described herein, one or more of the scanning mirrors 504 is implemented with a scanner as described above (e.g., scanner 100, 200, etc.). Such a scanning laser device 500 can be implemented to perform a variety of functions. For example, the scanning laser device 500 can be implemented to facilitate image projection, laser depth scanning, LIDAR, 3D motion sensing, gesture recognition, etc.

As one example, in a device implemented to provide image projection, the beam of laser light would be encoded with pixel data to generate image pixels. In another example, the laser light source 502 can include an infrared or other suitable laser that is used to generate the depth mapping pulses. Reflections of these pulses from a surface can then be received and used to generate 3-dimensional maps of the surface. For example, the depth map of the surface can be determined by calculating a time of flight for the return of each received depth mapping pulse.

Turning now to FIG. 6, a schematic view of a scanning laser projector 700 is illustrated. The scanning laser projector 700 is a more detailed example of the type of system that can be used in accordance with various embodiments of the present invention. Specifically, the scanning laser projector 700 can be implemented using the various scanners described above. In some embodiments, the scanning laser projector is implemented to provide both laser depth scanning and laser image projection, while in other embodiments, only image projection is provided.

Scanning laser projector 700 includes an image processing component 702, a pixel drive generator 704, an infrared laser module 705, a red laser module 706, a green laser module 708, and a blue laser module 710. In such an embodiment, the red, green and blue light can be used for image projection, while the infrared light can be used for depth scanning. Light from the laser modules is combined with dichroics 712, 714, 716, and 717. Scanning laser projector 700 also includes fold mirror 718, drive circuits 720, a first scanner assembly 722 with first scanning mirror 724, and second scanner assembly 726 with a second scanning mirror 728. It should be noted that this illustrated arrangement for combing the outputs from the various laser modules is just one example implementation, and other implementations using different techniques for combing laser light of different wavelengths can instead be used.

In operation, image processing component 702 processes video content using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto scanning mirrors 724 and 728. In general, the first scanning mirror 724 provides for one axis of motion (e.g., horizontal), while the second scanning mirror 728 provides for another axis of motion (e.g., vertical). In a typical implementation of such an embodiment, the second scanning mirror 728 is operated to provide the vertical scanning motion at a relatively slow scan rate, while the first scanning mirror 724 is operated to provide horizontal motion at a relatively fast scan rate. This results in the output beam 729 generating a scanning pattern 730.

To provide such a system, the rotation of the second scanning mirror 728 can be operated quasi-statically to create a vertical sawtooth raster trajectory. Conversely, the rotation of the first scanning mirror 724 can be operated on a resonant vibrational mode of the scanning mirror 724 to create sinusoidal motion. Together, this generates both horizontal and vertical motion of the laser beam and results in the pattern 514 of scan lines.

In these embodiments, output beam 729 sweeps back and forth left-to-right in a sinusoidal pattern, and sweeps vertically (top-to-bottom) in a sawtooth pattern with the display blanked during flyback (bottom-to-top). It should be noted that the illustrated scanning pattern 730 shows a sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. Finally, the various embodiments of the invention are not limited by the waveforms used to control the vertical and horizontal sweep or the resulting raster pattern 730.

It should be noted that in some embodiments, the first scanner assembly 722 and the second scanner assembly 726 both use electromagnetic actuation. However, in other embodiments one more of the scanner assemblies can use other techniques, including electrostatic or piezoelectric actuation. Furthermore, any number of mirrors and type of mirror actuation may be employed without departing from the scope of the present invention.

The drive circuits 720 provide drive signals to scanner assemblies 722 and 726. The drive signals include excitation signals to control the motion of the scanning mirrors 724 and 728. In operation, the laser light sources produce light pulses for each output pixel and scanning mirrors 724 and 728 reflect the light pulses as the output beam 729 traverses the pattern 730. Drive circuits 720 can also receive feedback signals from scanner assemblies 722 and 726. The feedback signals can describe the driven deflection angles of the mirrors, and can be used by the drive circuit 720 to more accurately control the motion of the scanning mirror 724.

For example, the drive circuit 720 can excite resonant motion of scanning mirror 724 such that the peak amplitude of the feedback signal is constant. This provides for a stable maximum angular deflection on the fast-scan axis as shown in raster pattern 730. The excitation signal used to excite resonant motion of scanning mirror 724 can include both amplitude and a phase. Drive circuit 720 includes feedback circuit(s) that modifies the excitation signal amplitude to keep the feedback signal peak amplitude substantially constant. Additionally, the drive circuit 720 can modify the excitation signal to control the horizontal phase alignment and vertical position of the raster pattern 730.

To facilitate this, drive circuit 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

Figure 5:
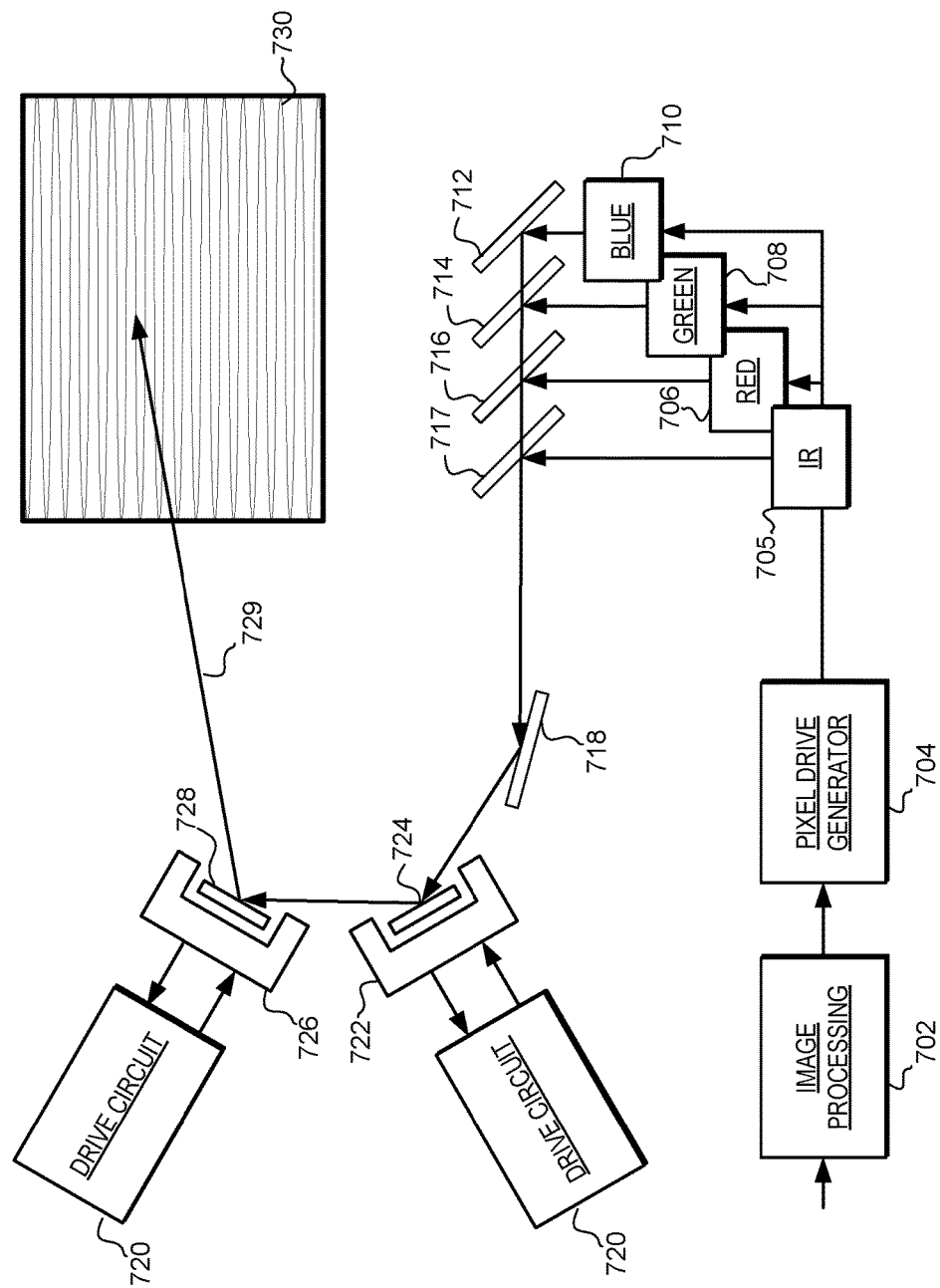
FIG. 5 shows a schematic view of a scanning laser projector in accordance with various embodiments of the present invention.

It should be noted that while FIG. 5 illustrates an embodiment with two drive circuits 720 and two scanner assemblies 722 and 726, that this is just one example implementation. As another example, a scanning laser projector could instead be implemented with fewer or more scanner assemblies and mirrors.

Finally, although red, green, blue, and infrared laser light sources are shown in FIG. 6, the various embodiments are not limited to these exemplary wavelengths of laser light.

In one embodiment, a scanner is provided that comprises: a scan plate, the scan plate including a scanning surface and a body structure extending away from scanning surface, the body structure including a first coupling feature opposite the scanning surface; a flexure structure including a second coupling feature, a first flexure arm and a second flexure arm, wherein the flexure structure is formed from a unitary MEMS semiconductor substrate; and wherein the first coupling feature is coupled to the second coupling feature and a first portion of the first flexure arm and a second portion of the second flexure arm overlap with the scanning surface.

In another embodiment, a scanner is provided that comprises: a scan plate, the scan plate including a scanning surface and an body structure extending away from scanning surface, the body structure including a first coupling feature, a first channel, and a second channel opposite the scanning surface; a flexure structure including a second coupling feature, a first torsion arm and a second torsion arm, wherein the flexure structure is formed from a unitary MEMS semiconductor substrate and wherein the flexure structure has a planar top surface and a planar bottom surface; and wherein the first coupling feature is coupled to the second coupling feature and a first portion of the first torsion arm and a second portion of the second torsion arm overlap with the scanning surface, and wherein the first channel is configured to receive the first portion of the first torsion arm and the second channel is configured to receive the second portion of the second torsion, and wherein the first channel is sized to provide a first gap between the scan plate and the planar top surface of the first portion of the first torsion arm to facilitate rotation of the first torsion arm and wherein the second channel is sized to provide a second gap between the scan plate and the planar top surface of the second portion of the second torsion arm to facilitate rotation of the second torsion arm.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanner, comprising:
   a scan plate, the scan plate including a scanning surface and a body structure extending away from scanning surface, the body structure including a first coupling feature opposite the scanning surface;
   a flexure structure including a second coupling feature, a first flexure arm and a second flexure arm, wherein the flexure structure is formed from a unitary MEMS semiconductor substrate; and
   wherein the first coupling feature is coupled to the second coupling feature and a first portion of the first flexure arm and a second portion of the second flexure arm overlap with the scanning surface, wherein the scan plate includes a first channel configured to receive the first portion of the first flexure arm and a second channel configured to receive the second portion of the second flexure arm, and wherein the first channel is sized to provide a first gap between the scan plate and the first portion of the first flexure arm and wherein the second channel is sized to provide a second gap between the scan plate and the second portion of the second flexure arm.

2. The scanner of claim 1, wherein the first flexure arm comprises a first torsion arm, and wherein the second flexure arm comprises a second torsion arm.

3. The scanner of claim 1, wherein the first coupling feature and the second coupling feature fasten together with an interference fit.

4. The scanner of claim 1, wherein the first coupling feature and the second coupling feature fasten together with an adhesive.

5. The scanner of claim 1, wherein the first coupling feature and the second coupling feature fasten together with a mechanical fastener.

6. The scanner of claim 1, wherein the first coupling feature includes a first slot, and wherein the second coupling feature includes a first beam, and wherein the first slot is configured to receive the first beam when the first coupling feature is coupled to the second coupling feature.

7. The scanner of claim 1, wherein the first coupling feature includes a first pin, wherein the second coupling feature includes a first hole, and wherein the first hole is configured to receive the first pin and have an interference fit with the first pin when the first coupling feature is coupled to the second coupling feature.

8. The scanner of claim 1, wherein the first flexure arm has an overall length, and wherein the first portion of the first flexure arm has an overlapping length, and wherein the overlapping length of the first portion of the flexure arm is at least 20 percent of the overall length of the first flexure arm.

9. The scanner of claim 1, wherein the flexure structure has a top surface facing the scan plate, and wherein the top surface of the flexure structure is offset from the scanning surface.

10. The scanner of claim 1, wherein the flexure structure has a planar top surface.

11. The scanner of claim 1, wherein the scan plate is formed by molding.

12. The scanner of claim 1, wherein the scanning surface includes an optical coating.

13. The scanner of claim 1, wherein the scanning surface comprises a diffraction surface.

14. A scanner, comprising:
    a scan plate, the scan plate including a scanning surface and a body structure extending away from scanning surface, the body structure including a first coupling feature, a first channel, and a second channel opposite the scanning surface;
    a flexure structure including a second coupling feature, a first torsion arm and a second torsion arm, wherein the flexure structure is formed from a unitary MEMS semiconductor substrate and wherein the flexure structure has a planar top surface and a planar bottom surface; and
    wherein the first coupling feature is coupled to the second coupling feature and a first portion of the first torsion arm and a second portion of the second torsion arm overlap with the scanning surface, and wherein the first channel is configured to receive the first portion of the first torsion arm and the second channel is configured to receive the second portion of the second torsion, and wherein the first channel is sized to provide a first gap between the scan plate and the planar top surface of the first portion of the first torsion arm to facilitate rotation of the first torsion arm and wherein the second channel is sized to provide a second gap between the scan plate and the planar top surface of the second portion of the second torsion arm to facilitate rotation of the second torsion arm.

15. The scanner of claim 14, wherein the first coupling feature and the second coupling feature fasten together with an interference fit.

16. The scanner of claim 14, wherein the first coupling feature includes a first slot, and wherein the second coupling feature includes a first beam, and wherein the first slot is configured to receive the first beam when the first coupling feature is coupled to the second coupling feature.

17. The scanner of claim 14, wherein the first coupling feature includes a first pin, wherein the second coupling feature includes a first hole, and wherein the first hole is configured to receive the first pin and have an interference fit with the first pin when the first coupling feature is coupled to the second coupling feature.

18. The scanner of claim 14, wherein the first torsion arm has an overall length, and wherein the wherein first portion of the first torsion arm has an overlapping length, and wherein the overlapping length of the first portion of the torsion arm is at least 20 percent of the overall length of the first torsion arm.

19. The scanner of claim 14, wherein the flexure structure has a top surface facing the scan plate, and wherein the top surface of the flexure structure is offset from the scanning surface.

* * * * *